United States Patent [19]
Leng

[11] Patent Number: 6,011,228
[45] Date of Patent: Jan. 4, 2000

[54] LOCKING KEY SWITCH

[75] Inventor: Peter Leng, Mainz, Germany

[73] Assignee: Eaton Controls GmbH & Co. KG, Bingen, Germany

[21] Appl. No.: 08/605,223

[22] PCT Filed: Sep. 6, 1994

[86] PCT No.: PCT/DE94/01033

§ 371 Date: Mar. 8, 1996

§ 102(e) Date: Mar. 8, 1996

[87] PCT Pub. No.: WO95/07541

PCT Pub. Date: Mar. 16, 1995

[30] Foreign Application Priority Data

| Sep. 9, 1993 | [DE] | Germany | 43 30 578 |
| Apr. 7, 1994 | [DE] | Germany | 44 11 927 |
| Aug. 10, 1994 | [DE] | Germany | 44 28 230 |

[51] Int. Cl.[7] .............. H01H 13/56; B60Q 3/02
[52] U.S. Cl. .............. 200/553; 200/523; 362/74
[58] Field of Search .............. 200/520, 522, 200/523, 525, 526, 528, 529, 533, 553, 556, 557, 558, 573, 335, 339, 341; 362/61, 74, 84, 85, 295, 362, 394

[56] References Cited

U.S. PATENT DOCUMENTS

| 3,811,043 | 5/1974 | Cope et al. ............. 240/8.16 |
| 4,300,026 | 11/1981 | Bull ............. 200/153 J |
| 4,482,940 | 11/1984 | Brandherm ............. 362/74 |
| 4,760,500 | 7/1988 | Peng ............. 362/74 |
| 4,916,269 | 4/1990 | Spazierer et al. ............. 200/408 |
| 5,107,084 | 4/1992 | Ueno et al. ............. 200/457 |
| 5,223,813 | 6/1993 | Cambreleng et al. ............. 337/66 |
| 5,508,485 | 4/1996 | Nishikawa ............. 200/525 |
| 5,582,474 | 12/1996 | Van Order et al. ............. 362/74 |

*Primary Examiner*—Michael Friedhofer
*Attorney, Agent, or Firm*—Roger A. Johnston

[57] ABSTRACT

A push-button nonrestoring switch having a push-button pivoted on a switch housing with a rocker switching member pivoted on the housing, with a tappet member pivoted on the push-button and engaging the rocker switching member for effecting toggled movement from a neutral to a switching position either side of the neutral position.

29 Claims, 11 Drawing Sheets

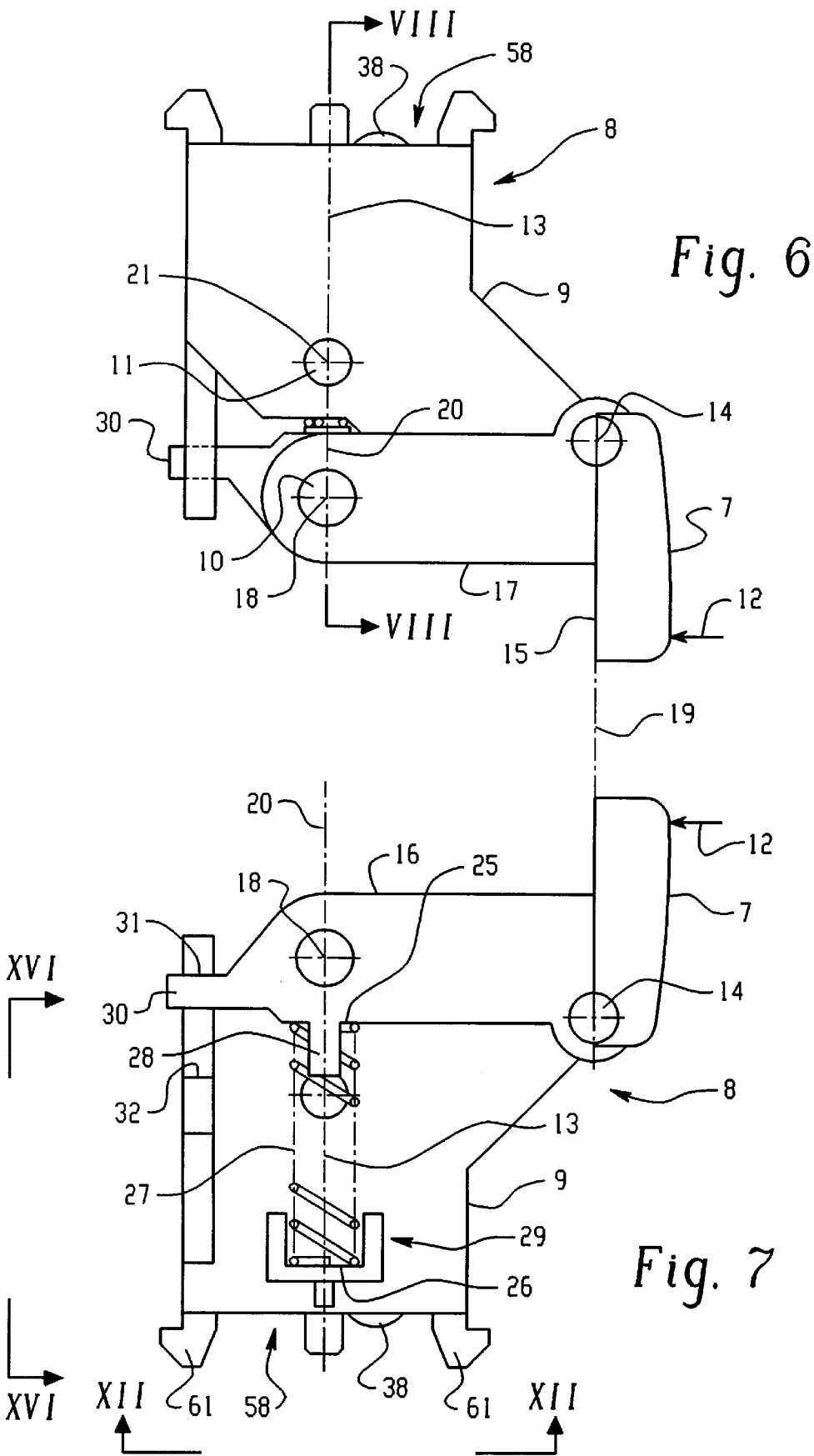

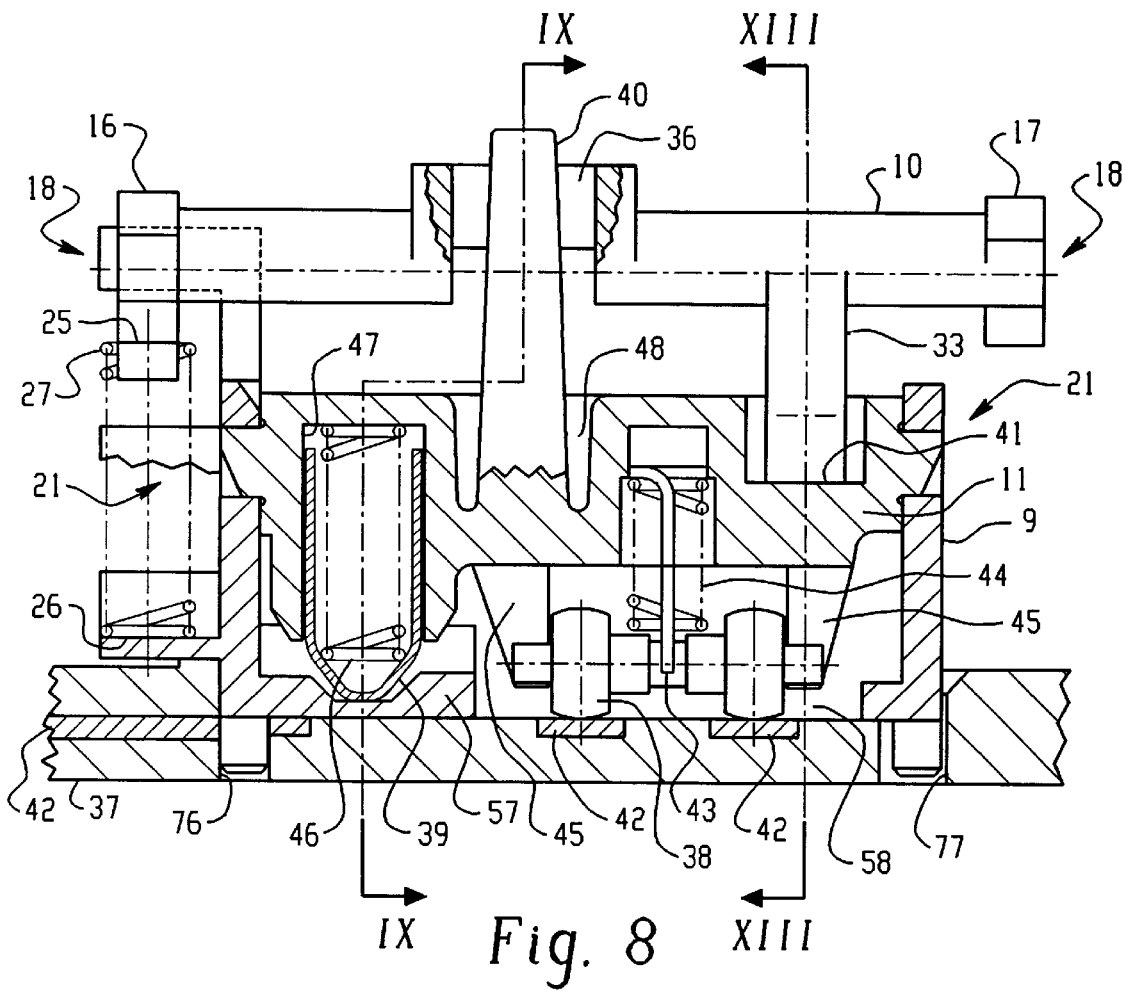
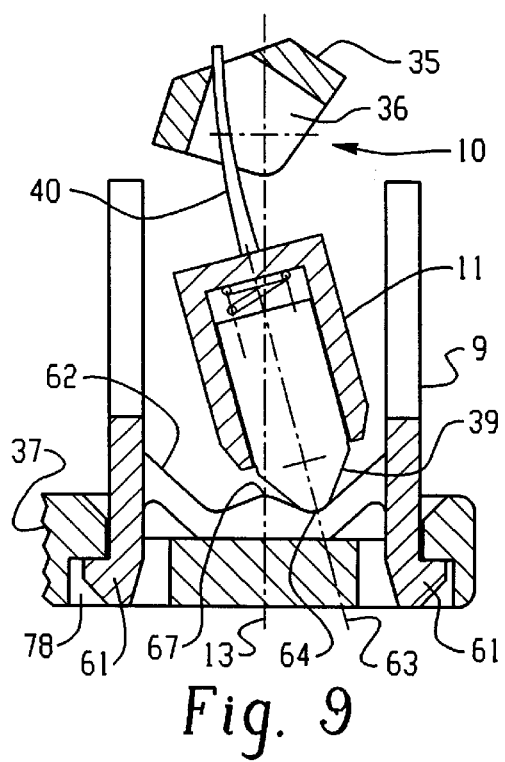
Fig. 9
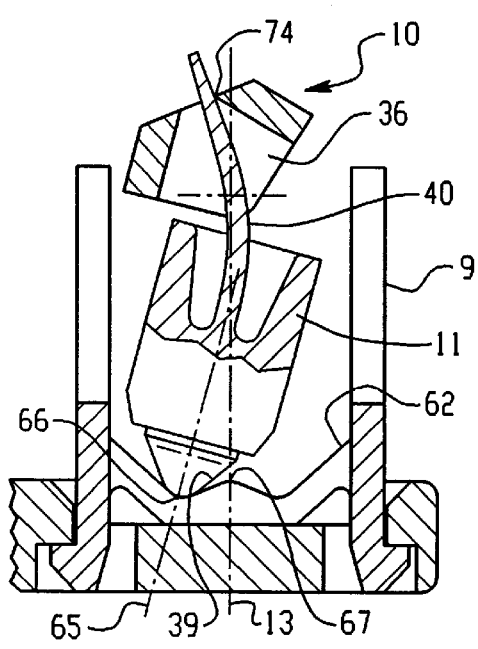
Fig. 10

LOCKING KEY SWITCH

CROSS REFERENCE TO RELATED APPLICATION

This invention relates to a push-button nonrestoring switch, notably for the interior reading light of an automobile, comprised of a housing and pertaining base, a spring-loaded push-button that is movable relative to the housing, a tappet movable by the push-button, and a rocker that is pivotable by the tappet and features a spring-loaded contact bridge acting on contacts provided on the base.

Known from DE-OS 37 24 736 A1 is an electric switch, notably for automobiles, which features a housing to which pertains a base and with whose push-button, which is movable preferably linearly in relation to the housing. Moreover, the electric switch comprises a tappet that allows displacement by the push-button and pivots relative to the push-button and also, comprises which is pivotably mounted in the base. The rocker is alternately pivoted back and forth by means of the push-button and the tappet, between two limit positions, and controls a movable contact bridge, notably a snap-action spring, the tappet being fitted in the base.

Due to the direct linear stacking of base, housing and push-button with their enclosed rocker and tappet, the prior switch is very large in size. The stroke required for changeover of the rocker must be possible also on the push-button.

Therefore, the objective underlying the invention is to provided a push-button nonrestoring switch of the type where an extremely short actuating stroke is accomplished while at the same time having a small size given.

SUMMARY OF THE INVENTION

This objective is inventionally met in that the push-button is fitted pivotably to the housing, the tappet pivotably to the push-button, and the rocker—acted upon by the tappet—pivotably to the housing.

The push-button, housing, tappet and rocker are given pivotal points that are exactly defined relative to one another, thereby eliminating the relatively large tolerances of the guideways.

According to a favorable advancement of the invention, the direction of actuation of the push-button is perpendicular to the axis of the housing, leading to small dimensions.

According to a further favorable embodiment of the invention, a bearing is provided between push-button and housing, on the end opposite of where the actuation direction is provided for on the push-button. There are two pivot levers molded to the push-button in which the bearing between push-button and tappet is integrated. The axis of the bearing between push-button and tappet being in the inoperative position in alignment with the axis of the housing. In addition to the extremely short stroke, this arrangement also achieves a switching without appreciable idle stroke.

In order to achieve an identical switching force level and identical switching feel in switching on and off, an advancement of the invention provides for arranging the bearing between housing and rocker on the center axis of the housing.

In a preferred embodiment, the joining the bearing between housing and push-button, the bearing between push-button and tappet, and the bearing between housing and rocker is possible with the use of clips. Thus, all parts of the push-button nonrestoring switch are from the operating side structured already as a module, which allows easy and cost-effective push-button nonrestoring switch assembly.

Also preferred is that at least one of the pivot levers contained on the push-button possess a spring rest, that a spring abutment is molded to the housing, and that a spring is fitted between the spring rest on the pivot lever and the spring abutment on the housing. As a development of the preferred embodiment, a stop pin is molded to at least one pivot lever contained on the push-button, which pin limits with upper and lower stop cams arranged on the housing the actuation stroke of the push-button. This limits, for one, the safe actuation of the push-button by striking on the lower stop cam under the effect of the actuating force on the push-button and, for another, limits upon release of the actuating force the path of resetting under the effect of the compression spring, by the upper stop cam.

A further favorable embodiment is given in that the tappet features on its ends the bearings between tappet and push-button, that to the tappet there are molded a switching finger with a V-shaped end and a switching coulisse with a V-shaped recess, with switching finger and switching coulisse mutualy opposed.

As a further preference, the rocker features on its ends the bearings between tappet and housing and, each symmetric toward the base, a contact bridge and a slider, and in the direction of the tappet a switching spring and a switching face. As a favorable embodiment of the invention, the housing is formed of a rectangular frame, to the narrow sides of which there are projections molded with axle journals for the bearing with the push-button, and the frame is toward the base partly closed off by a bottom featuring a gate type coulisse, with the contact bridge protruding through the remaining contact opening and locating pins as well as spring clips being molded to the underside of the housing frame.

As a favorable advancement of the inventional object, a gate type coulisse is fashioned in the bottom of the rectangular housing frame, with the aid of which a stable switching position is obtainable by means of a depression, and a further stable switching position by means of a further depression, with a boss arranged between the depressions. These measures enable in addition to the compact design also a stable assembly of the components relative to one another, a desired switching feel as well as a bistable behavior of the switching element, or push-button nonrestoring switch.

According to an alternative embodiment of the invention, a coulisse is fashioned in the bottom of the rectangular housing frame, said coulisse allowing to achieve a switching position by means of a bevel, with the switching position restoring under the effect of the spring-loaded slider automatically to home position upon push-button release. Thus, a different switching performance of the push-button nonrestoring switch is achievable merely by redesigning the bottom of the housing frame, converting the bistable switching performance to one that is monostable.

To accomplish a safe interaction of the components of the push-button nonrestoring switch, or of details of the components of the push-button nonrestoring switch, the switching finger of the tappet interacts with the switching face of the rocker in changing switching positions, and the switching spring of the rocker engages the switching coulisse of the tappet and extends through the opening so as to activate the tappet upon push-button release for the next actuation; spring-loaded in a bore, the slider of the rocker establishes in the coulisse in the housing bottom the different switching positions, while a spring-loaded, captive contact bridge is fitted between guide straps.

As a preferred embodiment of the push-button nonrestoring switch, the base features bores for the locating pins of the housing and openings for the spring clips of the housing, while housing and base are joined by means of clips. As a result, the housing position relative to the base is established by way of the locating pins on the housing that interact with the holes in the base, and the clips allow a quick, dependable and cost-effective assembly. As a favorable advancement of the invention, the base is a coated, stamped grid. This allows, for one, a strong flow of current and, for another, adaptability to switching conditions. In an alternative embodiment, the base is a printed circuit board with printed conductors provided on it, from which results easy adaptability to desired current paths.

As a further preference, a base is assigned to several push-button nonrestoring switches. The base features suitably a plug for electrical connection of the push-button nonrestoring switches. This arrangement allows mounting several push-button nonrestoring switches on a base and combining the current paths in one electric plug.

According to a further favorable embodiment of the invention, contact angles for bulb installation and mounting devices for reflectors are provided integrally on the base. This offers the advantage that the contact angles are tied in as electrically conducting elements—directly from the stamped grid or the conductor—and the reflector mounting devices are incorporated already at exact locations.

Preference is given, additionally, to fitting the base in guideways of an interior reading light housing, that the base features clip noses that interact with matching shoulders on the interior reading light housing, that a tab is molded to the base and engages a bore in the interior reading light housing, that studs are molded to the base that engage holes in a panel, that spring clips are molded to the interior reading light housing that interact with straps on the panel, that the panel contains openings for the push-buttons, and that translucent areas are fashioned in the panel. This allows fitting the base with the push-button nonrestoring switches, in their variable configuration, directly in an interior reading light housing, facilitated by guiding and fastening means, and enables the push-button nonrestoring switch assembly, which may be of a different, variable configuration, to enjoy additional mechanical protection by fitting it in the interior reading light housing with pertaining panel.

To obtain an optically improved overall impression of the interior reading light featuring the push-button nonrestoring switch where also the functional relationship between a push-button nonrestoring switch and pertaining light window is clearly evident, a preferred provision is that the translucent panel areas consist of a light window and at least one spotlight radiator. To obtain a better concentration of the light passing through the translucent areas, at least one translucent area of the panel is on the near side of the bulb suitably provided with prisms. As a favorable advancement of the invention, a light emission surface facing outward and away from the bulb forms a convex spherical section aligned symmetrically to an axis, while a light entrance surface facing the bulb tilts obliquely to the axis. Resulting from this measure is a directional illumination of a specific area, since the oblique light entrance surface with the prisms aligned in it produces a specific cone of light. To avoid light scattering and obtain a high-contrast transition from bright to dark and also improve the conic shape of the light radiator, a further preferred provision is that the light entrance area be covered partially by a strip consisting of opaque material, with a free edge of the strip that faces the axis forming a radius whose transitional edges to the panel are disposed approximately in the area of a line of symmetry of the spotlight radiator, and that the rise of the strip radius amounts to approximately one-half the radius of the spotlight radiator.

To obtain a greater light efficiency in the area of the spotlight radiators, the surface of the surrounding area between the smaller and the larger diameters of the spotlight radiators is suitably provided with a light-reflective coating. To accomplish a clean distinction of the light-reflecting coating and nonetheless be able to produce the panel in one and the same operation, without requiring expensive touchup, the surface of the light-reflective coating is according to a further favorable embodiment of the invention part of an annular reflector which as a component is included in the dual-color molding process where, to begin with, the opaque part with the annular reflector mount serving as substrate is injection-molded first, followed by assembly of the annular reflector to the substrate and, as final operation, by coating with the translucent material for the light window and the spotlight radiators. Following the dual-color injection molding process, a single component is ultimately on hand again, and not a part consisting either of the opaque material or the translucent material, whereby the handling at the assembly station is appreciably facilitated. The annular reflector can be produced from various materials.

But it has been demonstrated that, with two adjacent permanently joined parts, both parts should favorably consist of the same material. Therefore, the annular reflector is suitably a molded plastic part whose surfaces that are visible from the panel are highly polished or chrome-plated. Resulting thereof is an easy handling of the plastic annular reflectors, since they are relatively lightweight and unable to damage one another. Furthermore, the part being of plastic throughout facilitates recycling of the panel.

Automation of the operational sequences requires the annular reflector—whose surface is adapted to that of the panel and whose light emission cones are aligned toward the spotlight radiator—must allow robot handling as well. Therefore, the annular reflector features preferably, on its side away from the panel, pins for sorting, alignment and presenting to the intended mount, to be slipped with its pins in receiving bores fashioned in the substrate. The light-reflecting coating of the annular reflector must then no longer be covered with liquid plastic material. Therefore, the spotlight radiators are according to a preferred embodiment molded via ducts connecting to the pins, with the translucent material not flowing across the surface of the annular reflector.

A suitable provision also is that the tooling surfaces producing the light entrance surface and light emission surface of the panel be polished. This makes it possible to keep the light transmission losses through the translucent area of the panel as low as possible and further reduce the area of light scatter.

BRIEF DESCRIPTION OF THE DRAWINGS

FIG. 6, a side elevation of the push-button nonrestoring switch according to the invention, in the direction of arrow VI relative to FIG. 5;

FIG. 7, a side elevation of the push-button nonrestoring switch according to FIG. 5, in the direction of arrow VII;

FIG. 8, a section through the push-button nonrestoring switch according to FIG. 6, in the direction of arrows VIII—VIII;

FIG. 9, a section through the push-button nonrestoring switch according to FIG. 8, in the direction of arrows IX—IX;

FIG. 10, the section according to FIG. 9 after changeover of the push-button nonrestoring switch and before release of the push-button;

DETAILED DESCRIPTION

Figure 1:
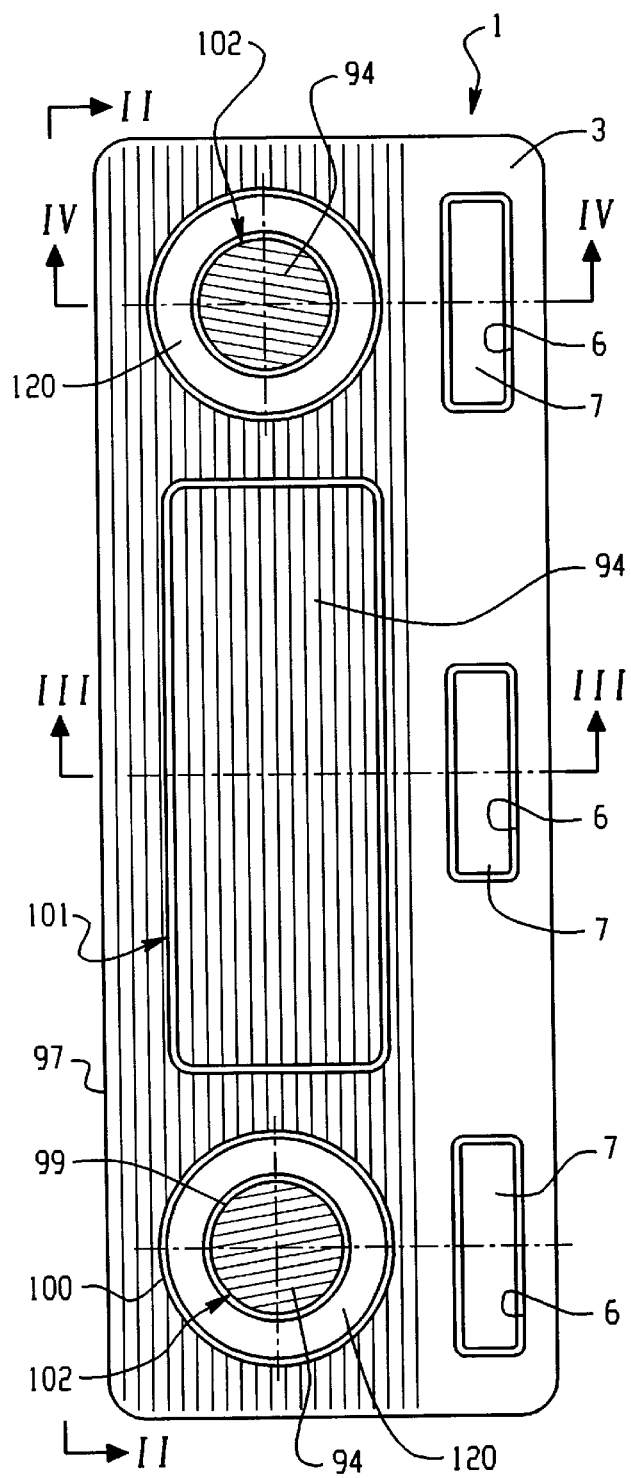
FIG. 1, a plan view of an interior reading light with push-button nonrestoring switches installed.
Figure 2:
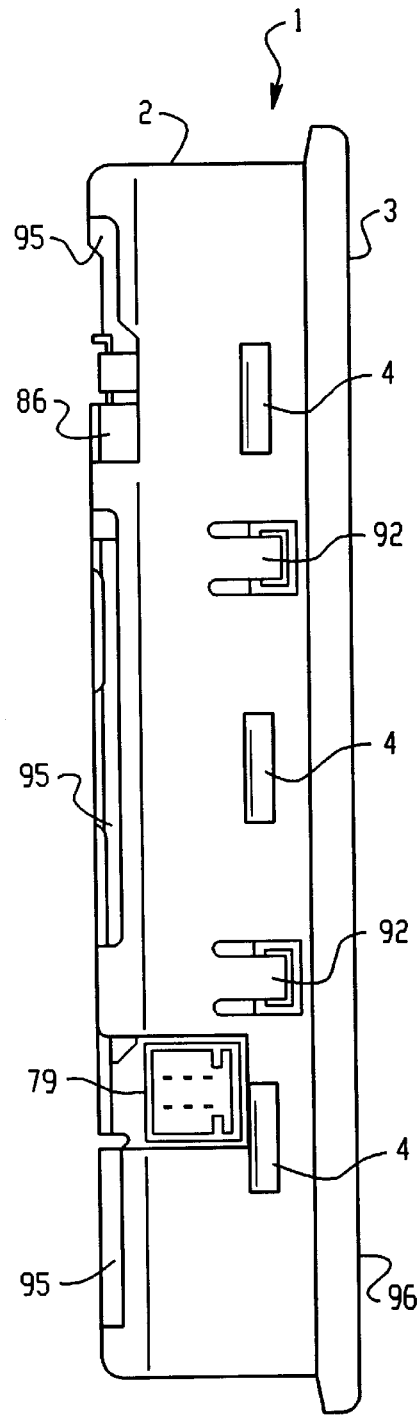
FIG. 2, a side elevation of the interior reading light according to FIG. 1, in the direction of arrow II.
Figure 3:
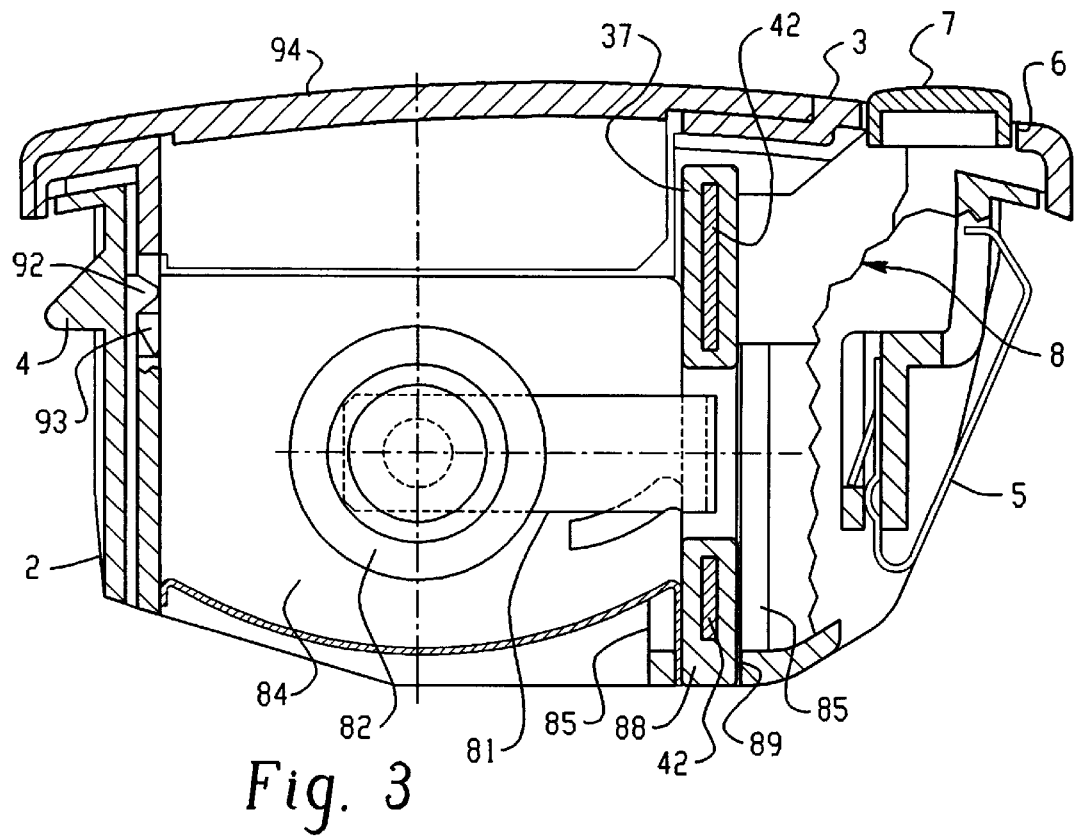
FIG. 3, a section through the interior reading light according to FIG. 1, in the direction of arrows III—III.
Figure 4:
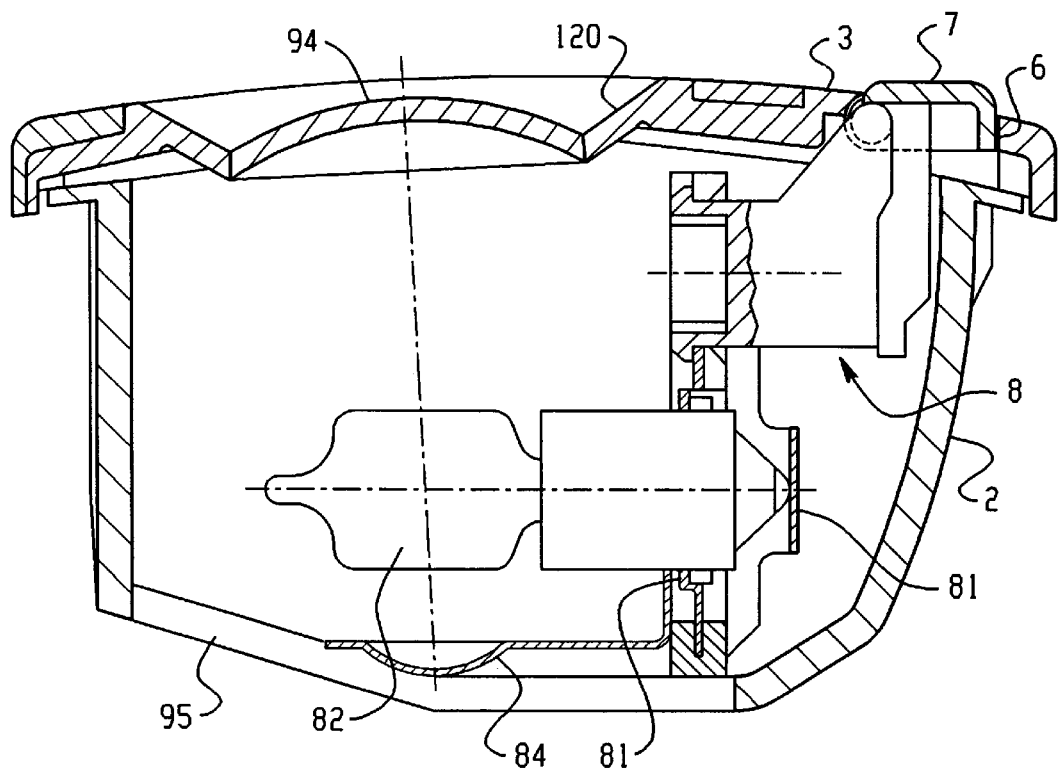
FIG. 4, a section through the interior reading light according to FIG. 1, in the direction of arrows IV—IV.

An interior reading light 1 features a cross-sectionally rectangular interior reading light housing 2 and a panel 3. Arranged on the interior reading light housing 2 are tabs 4 and retaining springs 5 for mounting on a not illustrated panel. Rectangular openings 6 for push-buttons 7 of push-button nonrestoring switches 8 are fashioned in the panel 3. On the push-button nonrestoring switch 8, the push-button 7 is pivotably mounted on the housing 9, the tappet 10 pivotably on the push-button 7, and the rocker 12, acted upon by the tappet 10, pivotably on the housing 9. Actuation of push-button 7 is initiated manually, the direction of actuation 12 of the push-button being perpendicular to the axis 13 of housing 9. Contained on the end opposite of where the actuation is exerted in the direction 12, on push-button 7, is the bearing 14 between push-button 7 and housing 9. Contained on the underside 15 of push-button 7, on its end, are two pivot levers 16 and 17 in which the bearing 18 between push-button 7 and tappet 10 is integrated. The axis 20 of bearing 18 between push-button 7 and tappet 10 is in the home position 19 in alignment with axis 13 of housing 9. Disposed on axis 13 of housing 9 is also the bearing 21 between housing 9 and rocker 11. Thus, bearings 18 and 21 are in the home position 19 disposed on axis 13 of housing 9.

Bearing 14 between housing 9 and push-button 7 is assembled by means of clip 22, bearing 18 between push-button 7 and tappet 10 by means of clip 23, and bearing 21 between housing 9 and rocker 11 by clip 24, with bevels facilitating the clip connections.

Molded to the pivot lever 16 contained on push-button 7 is a spring rest 25 that features a centered retaining pin 28. The housing 9 features a spring abutment 26 having the shape of a U-frame 29. Fitted between spring rest 25, on pivot lever 16, and spring abutment 26, on housing 9, is a spring 27 which resets the pivot lever 16, and with it the push-button 7, opposite to the direction of actuation 12, to its home position 19.

The pivot lever 16 contained on push-button 7 features on its end opposite bearing 14 a stud 30, which along with upper stop cams 31 and lower stop cams 32 contained on housing 9 limits the actuating stroke of push-button 7. As push-button 7 is actuated in the direction 12, pivot lever 16 continues to pivot against compression spring 27 until its stud 30 engages the lower stop cam 32. As push-button 7 is released, pivot lever 16 pivots under the effect of compression spring 27 about bearing 14 back until the stud 30 engages the upper stop cam 31.

Tappet 10 features on its ends the bearings 18, between tappet 10 and push-button 7. Contained on tappet 10, additionally, is a switching finger 33 with a V-shaped end 34 and a switching coulisse 35 with a V-shaped recess 36. Switching finger 33 and switching coulisse 35 are in equidirectional symmetric alignment, with the open V-sides of switching finger 33 and switching coulisse 35 opposing each other. Switching finger 33 and switching coulisse 35 are integral with tappet 10. As tappet 10 pivots about axis 18, both the switching finger 13 and the switching coulisse 35 pivot as well. Rocker 11 features on its ends the bearings 21 between rocker 11 and housing 9. Present, for one in the direction of base 37, are a spring-loaded contact bridge 38 and a spring-loaded slider 29 and, for another in the direction of tappet 10, a switching spring 40 and switching face 41, each symmetric. As the rocker 11 pivots in bearing 21, contact bridge 38, slider 39, switching spring 40 and switching face 41 pivot along equidirectionally. The base 37 is a coated, stamped grid, its strips 42 serving, for one, as current path and, for another, as contact surface. Contact bridge 38 is fashioned as a contact roll, configured as a captive assembly with detent 43 and compression spring 44, the latter captive again, via clevis type ends, in the rocker 11. Slider 39 is fitted in a bore 47 in the rocker, with compression spring 46 arranged in between. Contained in the opposite direction, for one, is the switching spring 40 and, for another, the switching face 41. Switching spring 40 is an integral plastic molding and, thus, possesses the spring properties of the plastic material of rocker 11. To obtain a softer spring property, the point of attachment of switching spring 40 has been relocated inward through the recess 48 in the rocker 11. Hence, a considerably longer switching spring 40 has been created. The switching face 41 is perpendicular to axis 49, on which are disposed both the contact bridge 38 and the slider 39. The switching face features on its ends bounds 50 which extend obliquely outward. In axial direction, the switching face 41 with its bounds 50 is terminated by a side wall 51 each, creating the shape of an upwardly open tub.

The housing 9 is formed of a rectangular Same 52, to the narrow sides 53 of which there are projections 54 molded with axle journals 55 for the bearing 14 with push-button 7. Molding the projections 54 to the rectangular frame 52 allows the configuration of selective mechanical advantages. Also resulting is a better clip assembly for bearing 14. The rectangular frame 52 of housing 9 is toward the base 37 partly closed off by a bottom 57 with a gate type coulisse 56. Coulisse 56 has its working surfaces 62 in the direction of slider 39. Contact bridge 38 protrudes through the remaining contact opening 58, sliding thus on the base 37, or its stamped strips 42. Molded to the underside 59 of the rectangular frame 52 of housing 9 are locating pins 60 as well as spring clips 61. The locating pins 60 enable an exact positioning of the rectangular frame 9 of the push-button nonrestoring switch 8 on the base 37, with the spring clips 61 establishing the firm connection between the rectangular frame 6 and the base 37.

Fashioned in bottom 57 of the rectangular frame 52 of housing 9, the coulisse 56 enables, for one, a stable switching position 63 by means of depression 64 and, for another, a stable switching position 65 by means of depression 66. Disposed between depressions 64 and 66 is switching boss 67, safeguarding that always only the relevant stable switching position, 63 or 65, is established.

Figure 17:
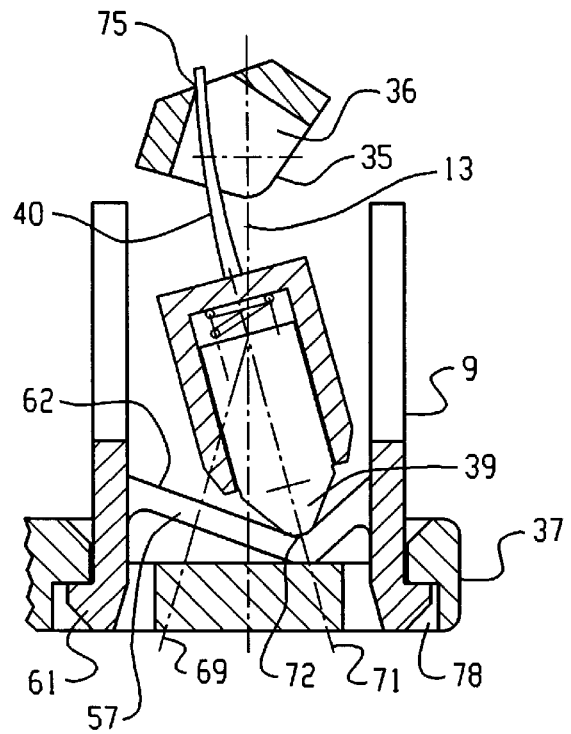
FIG. 17, a section through a push-button nonrestoring switch, as an alternative to FIG. 9.

An alternative embodiment is illustrated in FIG. 17. Fashioned in the bottom 57 of the rectangular frame 52 of housing 9 is a coulisse 68 for establishing a switching position 69 by means of a bevel 70. Upon release of push-button 7, resetting to home position 71 occurs automatically under the effect of the spring-loaded slider 39 along bevel 70. Hence, coulisse 68 has only one stable switching position, namely the home position 71 determined by depression 72.

Figure 13:
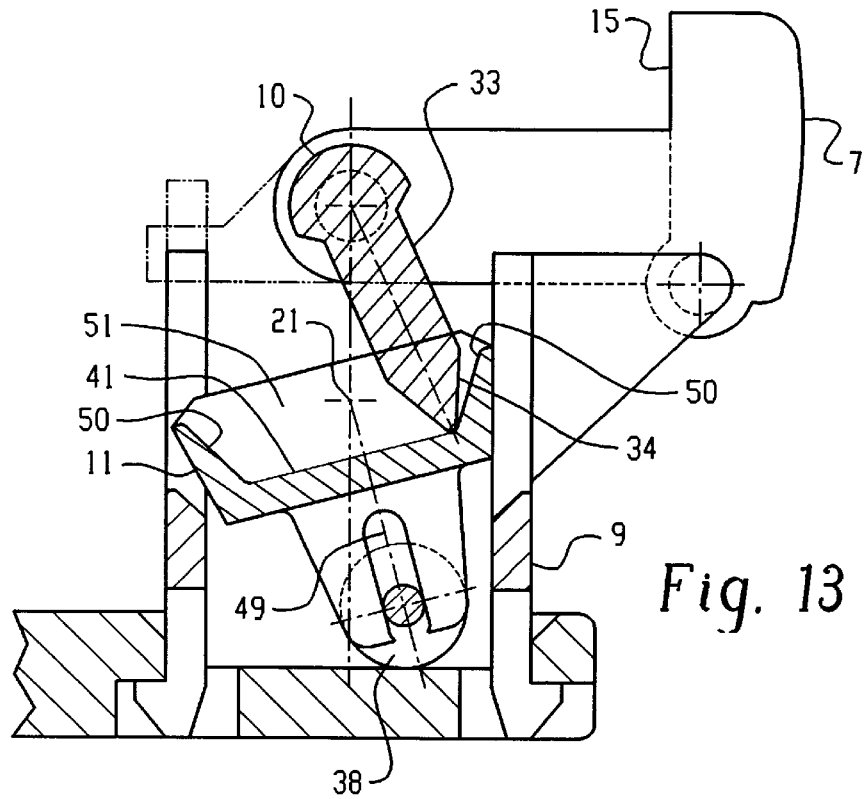
FIG. 13, a section through the push-button nonrestoring switch according to FIG. 8, in the direction of arrows XIII—XIII.
Figure 14:
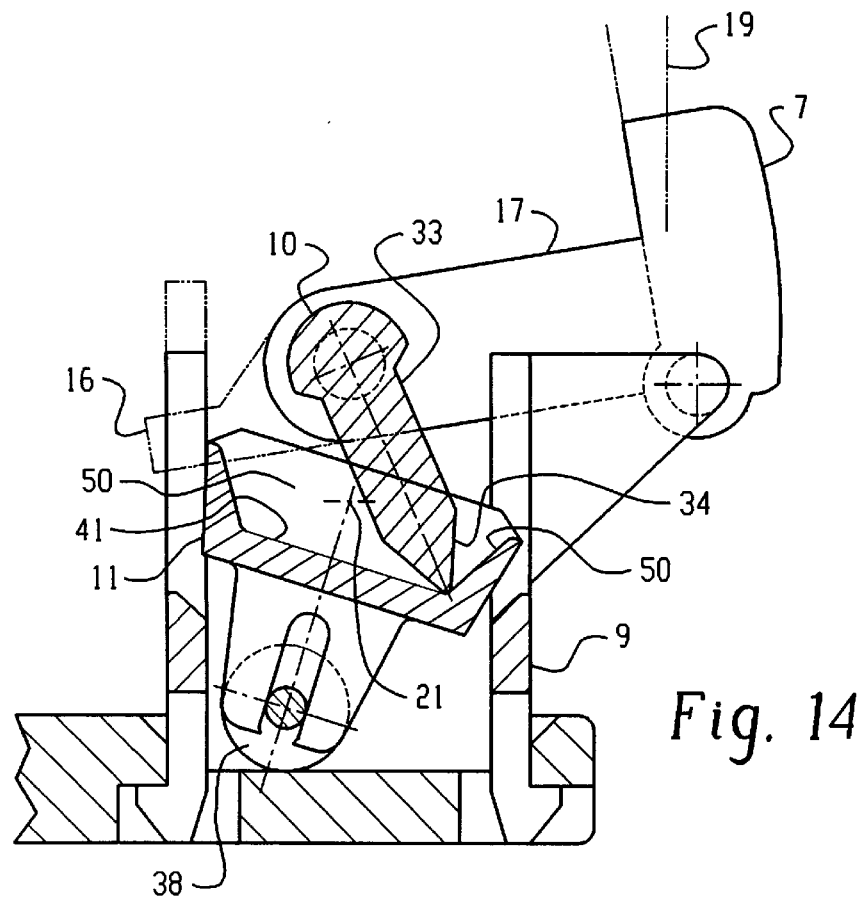
FIG. 14, the section according to FIG. 13 after switching and before release of the push-button.
Figure 15:
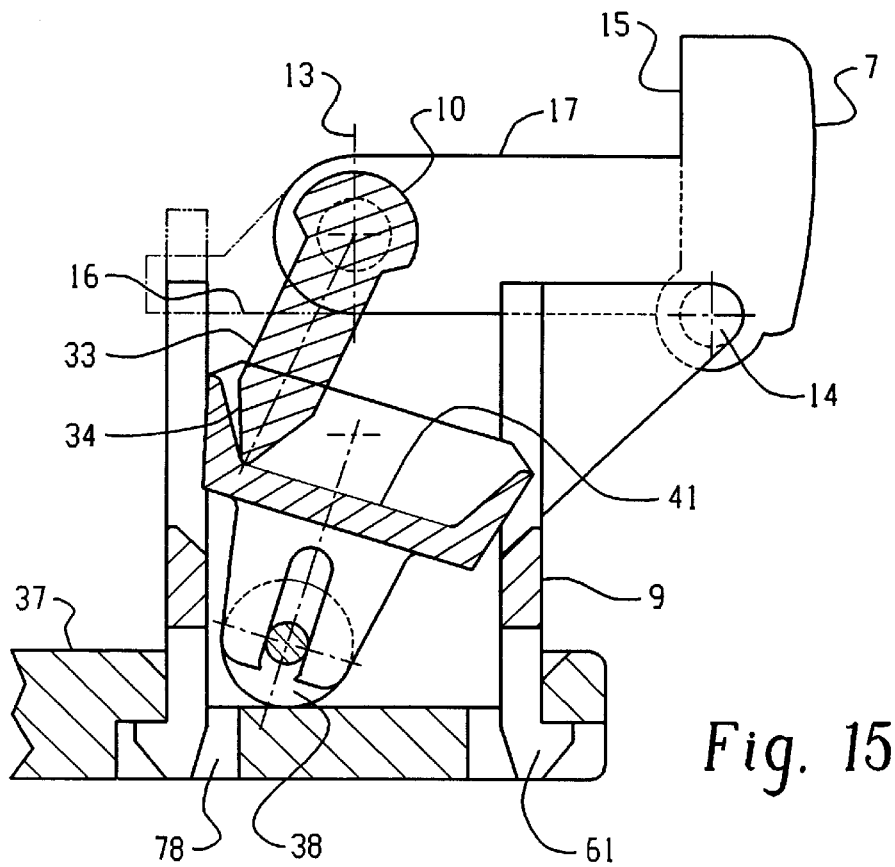
FIG. 15, the section according to FIG. 13 after switching and release of the push-button.
Figure 16:
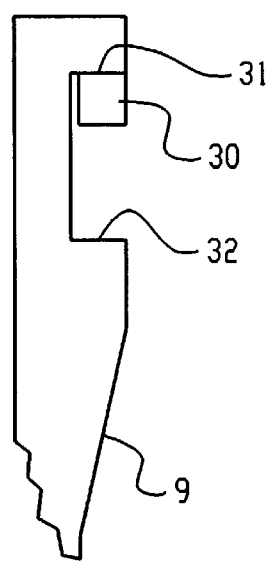
FIG. 16, a view of the push-button nonrestoring switch according to FIG. 7, in the direction of arrow XVI.

The entire switching procedure is as follows: Actuating the push-button 7 in the direction 12 causes the push-button 7 to pivot with pivot levers 16 and 17 about bearing 14. Pivot levers 16 and 17 move the tappet 10 into the interior of housing 9, with the switching finger 33 contained on tappet 10 pushing down on the switching face 41 of rocker 11 and, thus, pivoting the rocker 11 about its bearing 21 (refer to FIG. 13 and 14). As the switching face 41 pivots, the contact roll 38 pivots along and establishes or interrupts a path of current. Slider 39 moves at the same time from depression 64 across boss 67 to depression 66 (refer to FIG. 9 and 10). Switching coulisse 35 of tappet 10 moves toward the housing 9. The switching spring 40 settles on edge 74 of the V-shaped recess 36. Releasing the push-button 7 allows it to assume its home position 19 under the effect of spring 27. Bearing on edge 74 of tappet 10, the switching spring 40 pivots simultaneously the tappet 10 to the position relative to FIG. 15, with the V-shaped tip 34 of switching finger 33 engaging the corner between switching face 41 and bound 50. The push-button nonrestoring switch is now ready for the next actuation.

In the alternative embodiment according to FIG. 17, of the push-button nonrestoring switch, slider 39 restores always to the depression 72. Switching spring 40 interacts always with the edge 75, causing the tappet 10 with its switching finger 33 to assume always the position relative to FIG. 13.

Figure 5:
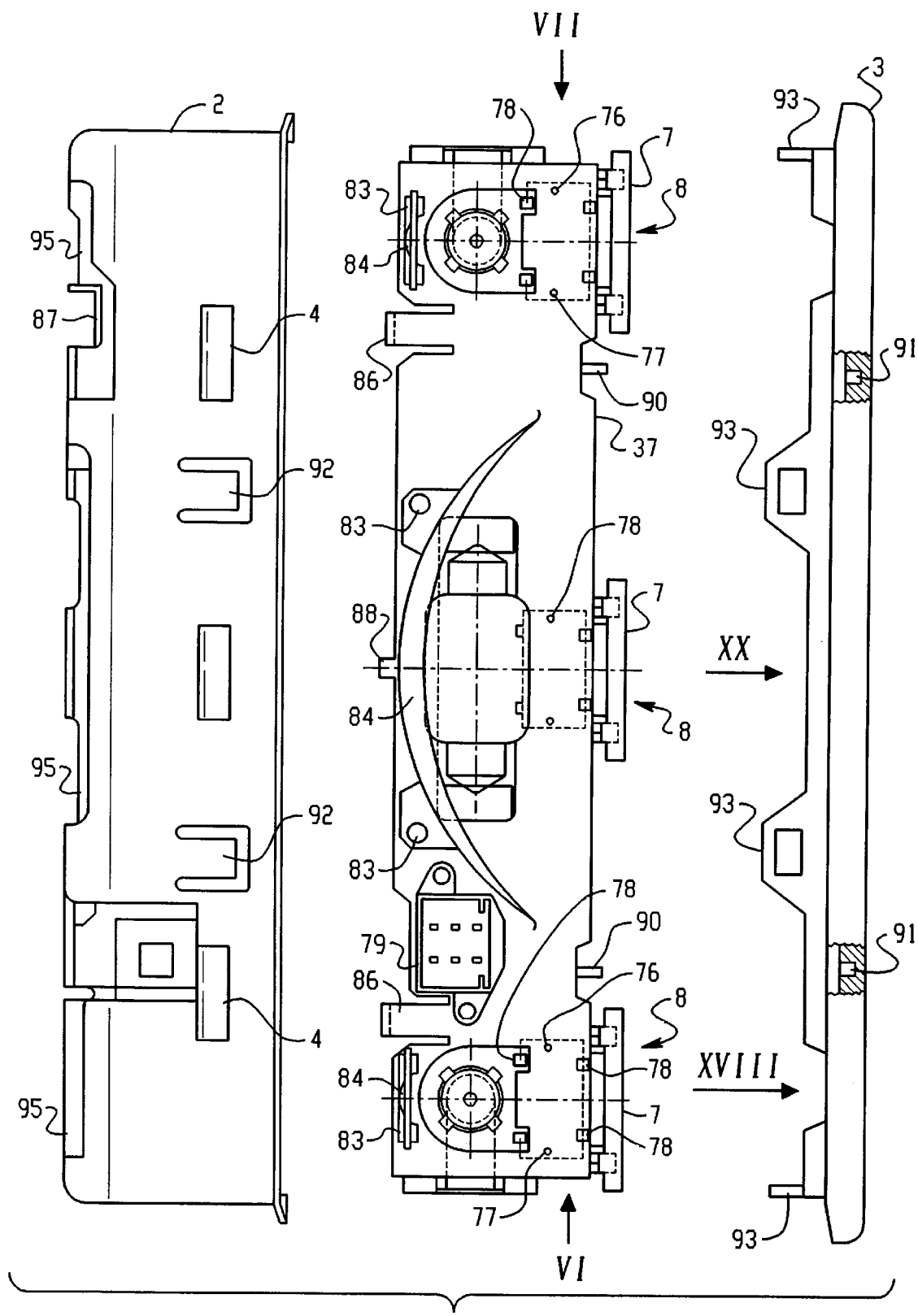
FIG. 5, a side elevation of the interior reading light according to FIG. 2 in disassembled state.
Figure 11:
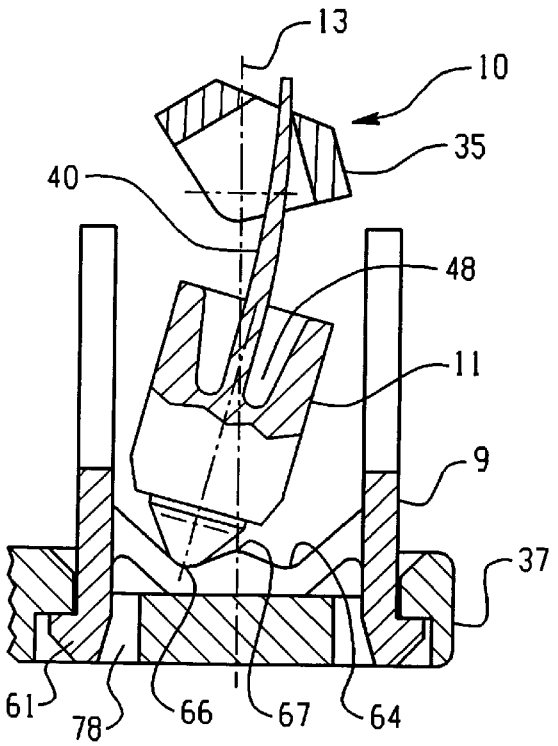
FIG. 11, the section according to FIG. 9 after switching and release of the push-button.
Figure 12:
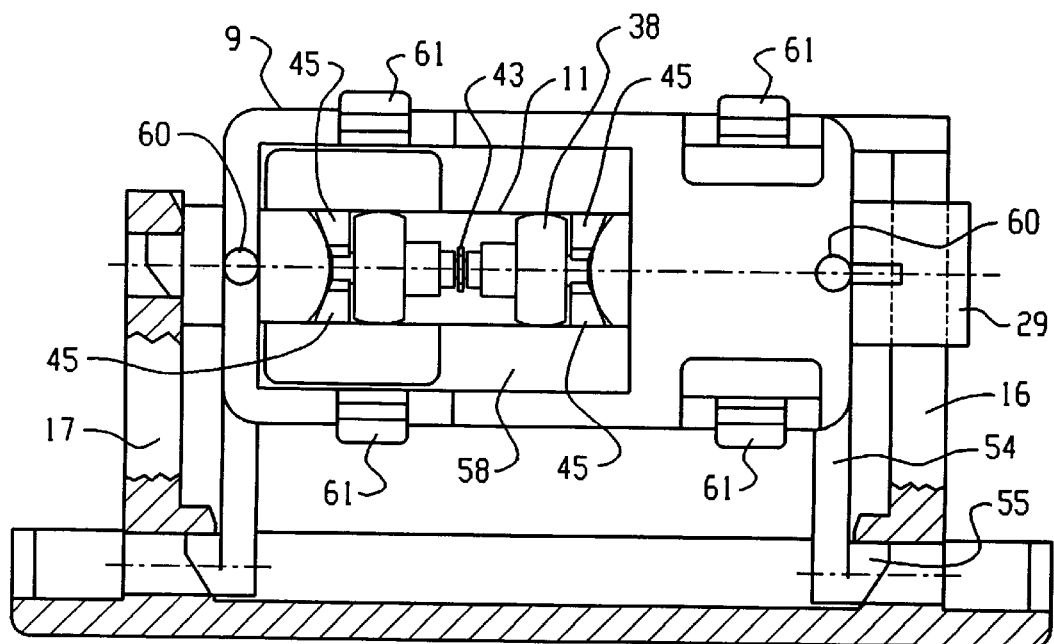
FIG. 12, a bottom view of the push-button nonrestoring switch according to FIG. 7, in the direction of arrow XII, with partial sections in the bearings.

The base 37 features bores 76 and 77 for receiving the locating pins 60 of housing 9. The bore 76 is cylindrical so as to exactly position the housing 9 of the push-button nonrestoring switch 8. The bore 77 is fashioned as an oblong hole so as to provide for tolerance adjustment. Fashioned in the base 37, furthermore, are slots 78 for the spring clips 61 of housing 9, with the aid of which the housing 9 and base 37 are joined. The base 37 is a coated, stamped grid with strips 42. As an alternative, the base 37 may be a printed circuit board, with conductors substituting for the strips 42. As shown in FIG. 5, three push-button nonrestoring switches 8 are mounted on a contiguous base 37 by means of clips. Thus, the contact bridges 38 of the push-button nonrestoring switch 8 interact with a base 37, with only a single electric plug 79 provided for that purpose, for electrical connection of all push-button nonrestoring switches 8 assembled to the base 37. Fashioned in the interior reading light housing 2 is an opening 80 through which the electric plug 79 is accessible. Arranged additionally on the base 37 are mounting angles 81 for receiving bulbs 82. Brackets 83 serve the mounting of reflectors 84, by means of which the light rays of bulbs 82 are focused through the translucent fields in the panel 3.

The interior reading light housing 2 features guideways 85 serving to receive the base 37 of the push-button nonrestoring switches 8. The base 37 features clip noses 86 that interact with matching shoulders 87 in the interior reading light housing 2, with a pin 88 molded to the base 37 engaging a hole 89 in the interior reading light housing 2. Molded to the opposite side of base 37 are studs 90 that engage holes 91 in the panel 3. Molded to the interior reading light housing 2, moreover, are spring clips 92 that interact with tabs 93 on the panel 3, joining the units to one another. Owing to this configuration, the base 37—with push-button nonrestoring switches 8, bulbs 82, reflectors 84 and electric plug 79 assembled to it—can be fitted in the interior reading light housing 2. Pin 88 prevents the base assembly from being installed incorrectly. Clipped to the preassembled base 37 with interior reading light housing 2 is the panel 3, which contains openings 6 for the push-buttons 7. Upon assembly of the components, the push-buttons 7 protrude beyond the surface of panel 3. Contained above the bulb 82, in the panel 3, are translucent areas 94. Panel 3 is produced by a dual-color injection molding process allowing easy production of translucent and opaque areas and giving the exterior of panel 3 an attractive appearance.

Figure 18:
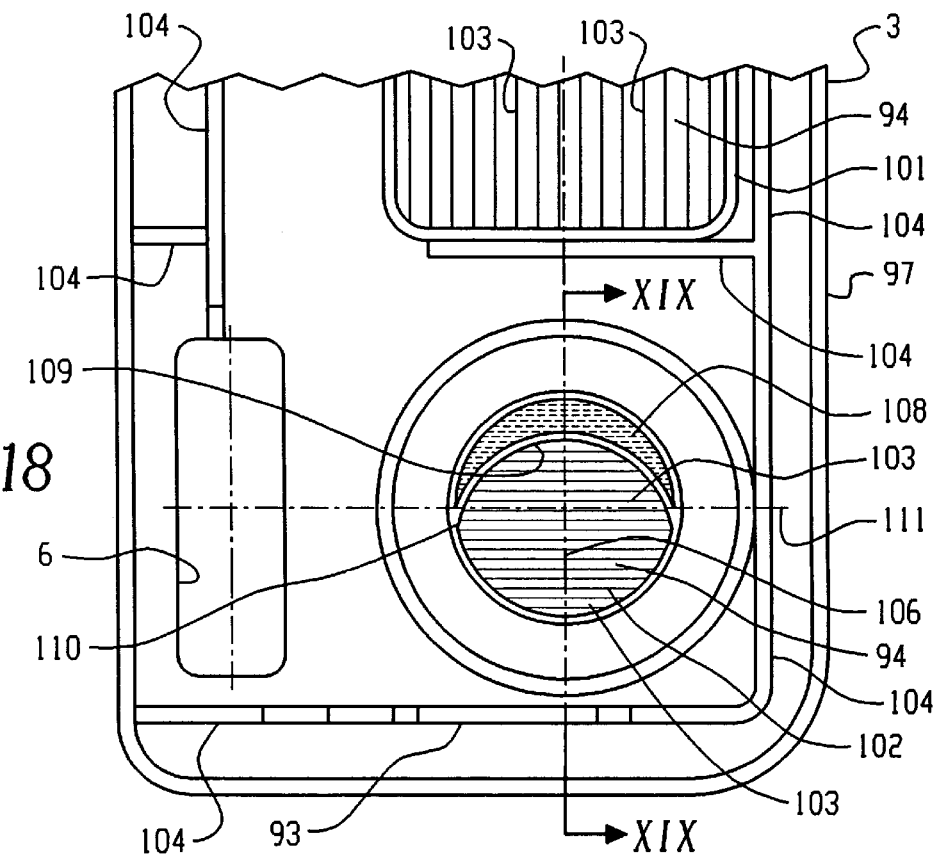
FIG. 18, a partial rear view of a panel according to FIG. 5, in the direction of arrow XVIII.
Figure 19:
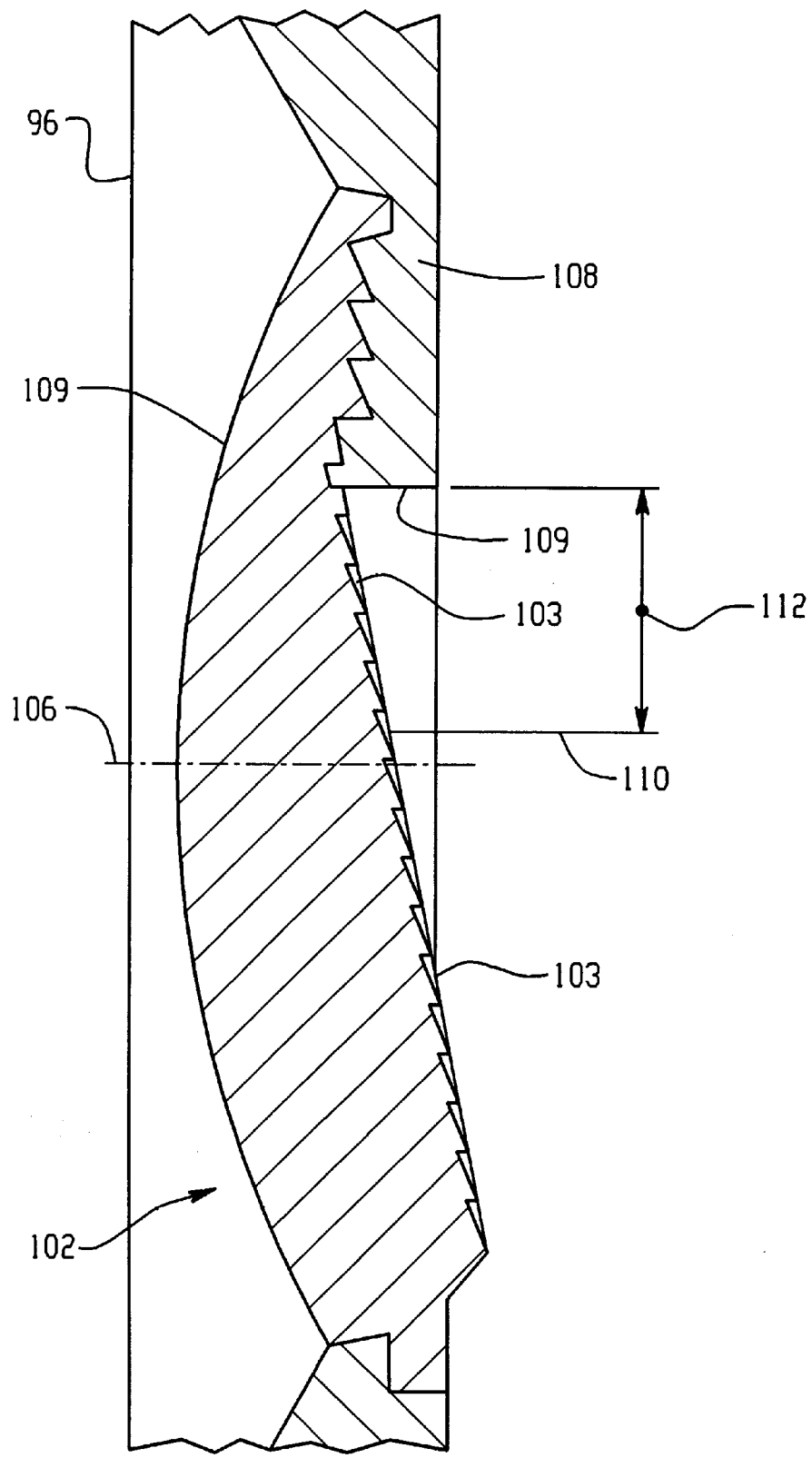
FIG. 19, a section through FIG. 18, in the direction of arrow XIX–XIX.
Figure 20:
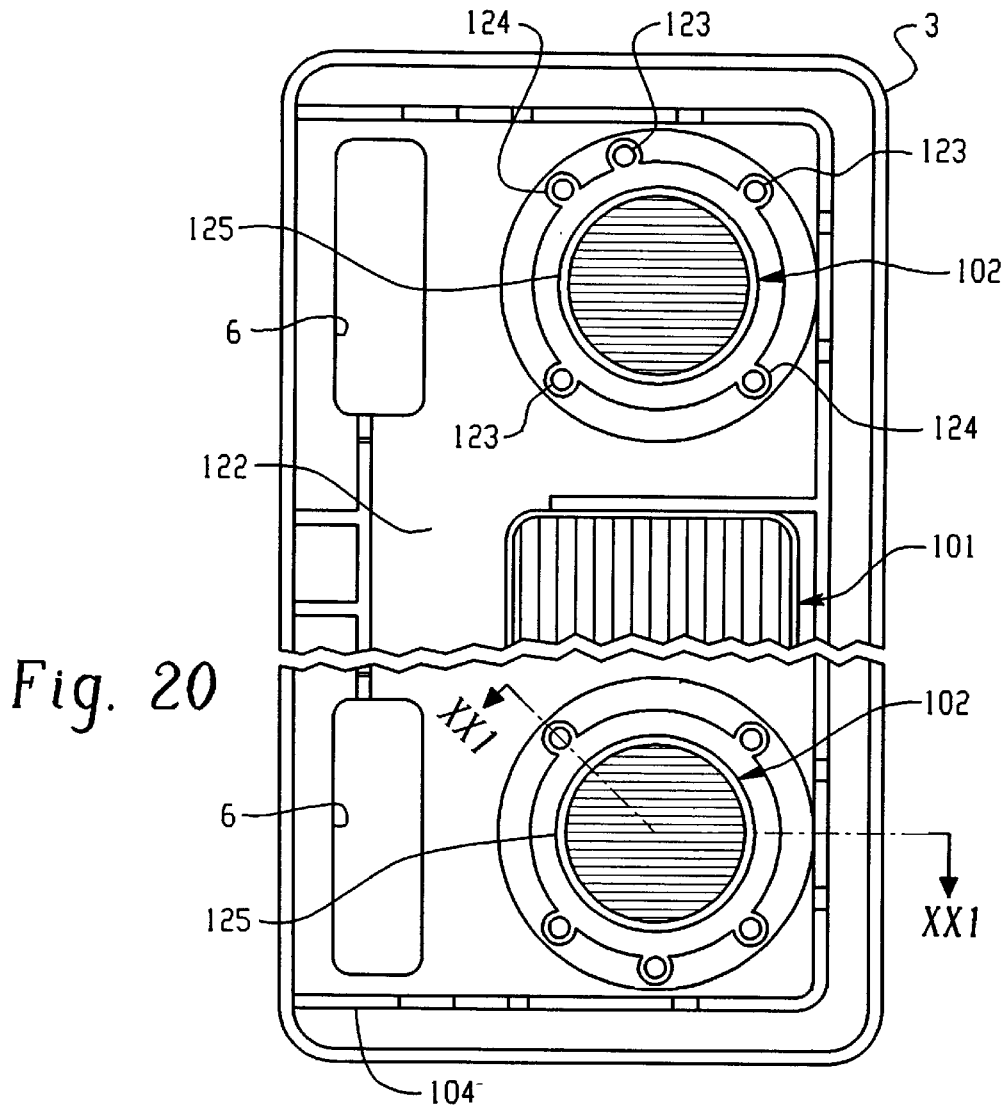
FIG. 20, a rear view of the panel according to FIG. 5, in the direction of arrow XX with the middle section broken away, and FIG. 21, a partial section through FIG. 20 in the direction of arrow XX—XX.
Figure 21:
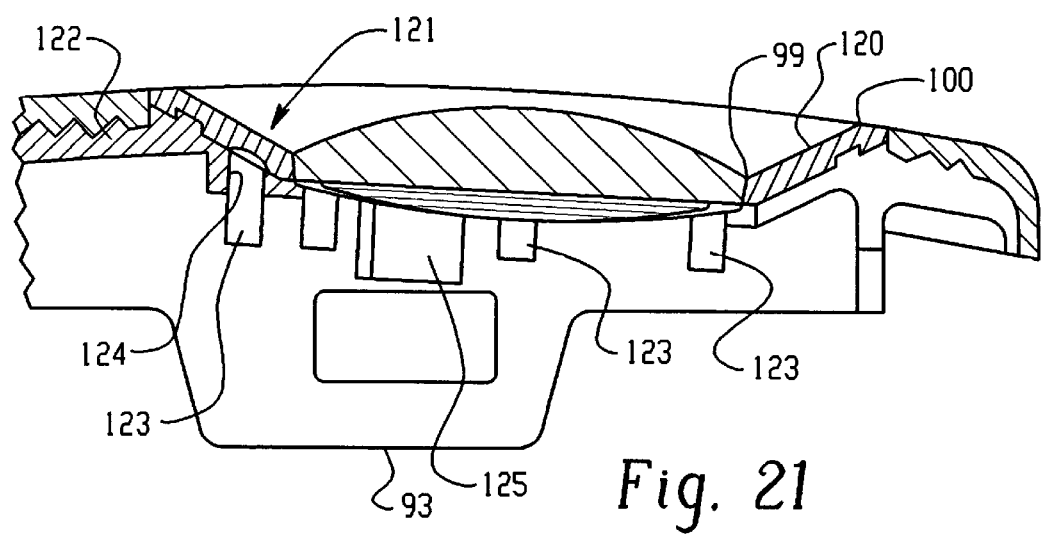

From the lateral bound $27^1$ opposite the openings 6 for the push-buttons 7 up to the boundary face 98, the area of the surface 96 is molded of translucent material. At the truncated cones existing within this area, the opaque material advances between the small diameter 99 and the larger diameter 100 up to the surface. A translucent area 94 is assigned to each push-button 7 in the panel 3. The large rectangular light window 101 pertains to the center push-button 7. The spotlight radiators 102 pertain to the outer push-buttons 7. The partial view of the panel 3, according to FIG. 18, shows an opening 6 for a push-button, the light window 101 and a spotlight radiator 102 from the rear of the panel. Webs 104 impart sufficient form stability to the panel 3. Tabs 93 molded to the webs 104 serve to clip the panel to the interior reading light housing 2. Visible in the light window 101 and in the spotlight radiator 102 are the prisms on the light entrance surface 107, which prisms serve to deflect the light according to requirements. Facing away from the bulbs 82, the light emission surface 105 of spotlight radiators 102 forms a convex spherical section of symmetric alignment relative to a center axis 106 extending in depth direction of the spotlight radiator. The light entrance surface 107 of spotlight radiator 102, facing the bulbs 82, slants relative to axis 106. A strap 108 of opaque material covers part of the light entrance area 107. The free edge 109 of strap 108 faces toward axis 106 and extends in a radius. The transitional edge 110 of the radius relative to the panel 3 enters the circular periphery of the spotlight radiator 102 approximately in the area of a line of symmetry 111. The rise 112 of the radius of strap 108 amounts approximately to one-half the radius of spotlight radiator 102. Hence, two adjacent quadrants of spotlight radiator 102 are in part covered by strap 108. The light rays passing through the spotlight radiator 102 are deflected in accordance with the inclination of the line of symmetry 111, on which also the prisms 103 are aligned.

[1] Translator: 27 has so far referenced a spring

The light efficiency of the spotlight radiators 102 can be appreciably increased by providing the surface 120 of the surrounding area between the small diameter 99 and the large diameter 100 with a light-reflective coating. Said area 120 provided with the light-reflective coating is part of an annular reflector 121, which is produced as a component in a separate operation. Said component is then incorporated in the dual-color molding process, molding first the opaque part serving as substrate 122. Along with the molding, the mounts for the annular reflector 121 are fashioned. Following the molding, the annular reflector 121 is fitted on the substrate 122. This is followed by the coating operation with the translucent material for the light window 101 and the spotlight radiators 102 as the final operation. The annular reflector 122 is made as a plastic molding. The surfaces of the annular reflector 121 that are visible from the panel 3 are glossy, which means that the relevant tooling surfaces must be highly polished. Furthermore, at least the surfaces visible from the panel may be chrome-plated, which is possible through a cover mount. Conceivable just as well is subjecting the molded annular reflectors 121 to an overall surface treatment in a dipping bath. Mounts for the annular reflector 121 are provided in the substrate 122; these are molded as receiving bores 124. Locating pins 123 are contained on the annular reflector 121, on its side away from the panel 3. Said pins 123 allow sorting, aligning and presenting the annular reflectors to the mounts intended for them. Once presented to the mounts, the locating pins 123 engage the receiving bores 124 fashioned in the substrate 122. The surface 120 of the annular reflectors 121 must no longer be touched by liquid plastic. This is to avoid heat distortions of chrome-plated surface 120 or separation of the chrome. Therefore, cavities are provided in the tooling, by way of which the spotlight radiators 102 are provided with studs 125 in molding, to which the sprues connect. Tooling thus safeguards that liquid plastic material will no longer flow across the surface 120.

The prisms 103 as well as the convex spherical section of the light emission surface 105, and also the areas between the small diameter 99 and the large diameter 100, possess a very clean surface, which is accomplished by polishing the tooling faces that produce these surfaces.

To assure heat removal, openings 95 are fashioned in the back of the interior reading light housing 2.

I claim:

1. A push-button nonrestoring switch, comprised of a housing and pertaining base, a spring-loaded push-button that is movable relative to the housing, a tappet movable by the push-button, and a rocker pivoted by the tappet and including a spring-loaded contact bridge that acts upon contacts on the base, characterized in that the push-button is pivoted on the housing, the tappet pivoted on the push-button, and the rocker, acted upon by the tappet pivoted on the housing.

2. A push-button nonrestoring switch according to claim 1, characterized in that a bearing and the housing on the end opposite of where the actuation occurs on the push-button, and on the underside of the push-button there are two pivot levers molded in which the bearing between push-button and tappet are integrated, the axis of the bearing, between the push-button and tappet being in a home position in alignment with an axis of the housing.

3. The push-button nonrestoring switch according to claim 1, characterized in that a bearing is disposed between said housing and said rocker and is arranged on a center axis of the housing.

4. The push-button nonrestoring switch according to claim 1, characterized in that assembly of a bearing between said housing, a bearing between said push-button and said tappet, and a bearing between said housing and said rocker is accomplished using clips.

5. The push-button nonrestoring switch according to claim 1, characterized in that at least one pivot lever contained on the push-button features a spring rest in that to the housing there is a spring abutment molded to the housing, and a spring disposed between the spring rest on the said at least one pivot lever and the spring abutment on the housing.

6. The push-button nonrestoring switch according to claim 1, characterized in that at least one pivot lever is contained on the push-button and there is a stud molded with upper stop cams and lower stop cams contained on the housing which limits an actuating stroke of the push-button.

7. The push-button nonrestoring switch according to claim 1, characterized in that the tappet features a plurality of bearings between said tappet and said push-button and a switching finger with a V-shape on an end, and a switching coulisse in which a V-shaped recess is fashioned are molded on said tappet, the switching finger and said switching coulisse being in equidirectional symmetric alignment with said switching finger V-shape and switching coulisse opposing each other.

8. The push-button nonrestoring switch according to claim 7, characterized in that a switching finger of said tappet interacts with a switching face of said rocker in changing between a first and a second switching position with a switching spring on said rocker engaging a coulisse of said tappet and protruding through an opening thereby activating said tappet upon push-button release for a subsequent actuation, in that a spring-loaded slider of said rocker, fitted in a bore, determines the said first and second switching positions in the coulisse, and wherein a spring-loaded captive contact bridge is disposed on the rocker between a plurality of guide straps.

9. The push-button nonrestoring switch according to claim 1, characterized in that the rocker features a plurality of bearings disposed between said rocker and said housing and, said assembly has a contact bridge and a spring-loaded slider, and, a switching spring and a switching face.

10. The push-button nonrestoring switch according to claim 1, characterized in that the housing is formed by a rectangular frame having a plurality of projections with axle journals for a bearing for the push-button, and the frame is partly closed off by a bottom featuring a coulisse, with a contact bridge protruding through contact openings and with locating pins and spring clips molded to the underside of said frame.

11. The push-button nonrestoring switch according to claim 1, characterized in that in a bottom of a rectangular frame of said housing has a coulisse by which a first stable switching position is achievable by means of a first depression and a second stable switching position by means of a second depression, with a boss disposed between the first and second depressions.

12. The push-button nonrestoring switch according to claim 1, characterized in that in a rectangular frame of said housing has a coulisse with the aid of which a switching position is obtainable by means of a bevel said switching position restoring upon release of said push-button automatically to a home position under the effect of a spring-loaded slider.

13. The push-button nonrestoring switch according to claim 1, characterized in that said base features a plurality of bores each for a locating pin of the housing a plurality of clip slots each for a spring clip of said housing, and in that said housing and said base are joined by means of said clips.

14. The push-button nonrestoring switch according to claim 1, characterized in that said base is a coated stamped grid.

15. The push-button nonrestoring switch according to claim 1, characterized in that said base is a printed circuit board with conductors contained in it.

16. The push-button nonrestoring switch according to claim 1, characterized in that said base is assigned to several push-button nonrestoring switches.

17. The push-button nonrestoring switch according to claim 1, characterized in that an electric plug for electrical connection is provided on said base.

18. The push-button nonrestoring switch according to claim 1, characterized in that a contact, retaining angle for receiving a bulb, as well as devices for mounting reflectors are provided integrally on said base.

19. The push-button nonrestoring switch according to claim 1, characterized in that said base is disposed in guideways of an interior reading light housing and said base features at least one clip nose that interacts with an appropriate shoulder on the interior reading light housing a pin that engages a hole in the interior reading light housing and studs which engage holes in a panel are molded to said interior reading light housing and spring clips which interact with tabs on the panel are molded to said interior reading light housing wherein said panel contains openings for said push-buttons, and translucent areas are provided in said panel.

20. The push-button nonrestoring switch according to claim 1, characterized in that the translucent areas of said panel consist of a light window and at least one spotlight radiator.

21. The push-button nonrestoring switch according to claim 1, characterized in that at least one translucent area of said panel is provided with prisms.

22. The push-button nonrestoring switch according to claim 1, characterized in that tooling surfaces producing a light entrance area and a light emission area of a panel are polished.

23. The push-button nonrestoring switch according to claim 1, characterized in that a light emission area of a spotlight radiator forms a convex spherical section that is aligned symmetrically relative to an axis, and a light entrance area is inclined relative to said axis.

24. The push-button nonrestoring switch according to claim 1, characterized in that a light entrance area is in part covered by a strap consisting of opaque material, with a free edge of said strap, facing an axis, forming a radius whose transitional edges are disposed approximately in the area of a line of symmetry of a spotlight radiator, and the radius of the strap amounts to approximately one-half the radius of said spotlight radiator.

25. The push-button nonrestoring switch according to claim 1, characterized in that a surface between a small diameter and a large diameter of a spotlight radiator is provided with a light-reflecting coating.

26. The push-button nonrestoring switch according to claim 1, characterized in that a surface with a light reflective coating is part of an annular reflector which as a component is incorporated in a dual-color molding process, with an opaque part serving as a substrate and having mounts for said annular reflector being molded first, followed by attaching the annular reflector to the substrate, and by a coating operation with translucent material, for light windows and spotlight radiators, as a final operation.

27. The push-button nonrestoring switch according to claim 1, characterized in that an annular reflector comprising a plastic, molded part having surfaces visible from the panel which are highly polished or chrome-plated.

28. The push-button nonrestoring switch according to claim 1, characterized in that an annular reflector features on its side away from the panel locating pins by means of which it is sorted, aligned and presented to the mount intended for it, being inserted there, with its locating pins, in receiving bores fashioned in the substrate.

29. The push-button nonrestoring switch according to claim 1, characterized in that spotlight radiators are molded by way of sprues connected to studs, with translucent material not flowing across any surfaces of an annular reflector.

* * * * *